(12) United States Patent
Hoyer et al.

(10) Patent No.: US 6,243,105 B1
(45) Date of Patent: Jun. 5, 2001

(54) DRILL-DOWN METHOD TO HISTORICAL DATA IN A PERFORMANCE MONITOR USING A PLATFORM INDEPENDENT PROGRAM

(75) Inventors: Gary G. Hoyer; Rebecca A. Ramer, both of San Diego, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/196,490

(22) Filed: Nov. 19, 1998

(51) Int. Cl.⁷ .................................................. G06T 11/20
(52) U.S. Cl. ............................ 345/440; 345/418; 707/10
(58) Field of Search ...................... 345/440, 357, 345/327, 418; 707/10; 709/201, 202, 223, 218, 224, 249, 225, 229, 241, 227, 238; 370/392, 397

(56) References Cited

U.S. PATENT DOCUMENTS

| | | | |
|---|---|---|---|
| 5,572,643 | 11/1996 | Judson | 395/793 |
| 5,692,181 | 11/1997 | Anand et al. | 395/613 |
| 5,706,502 | 1/1998 | Foley et al. | 395/610 |
| 5,708,780 | 1/1998 | Levergood et al. | 395/200.12 |
| 5,710,900 | 1/1998 | Anand et al. | 395/339 |
| 5,721,903 | 2/1998 | Anand et al. | 395/605 |
| 5,724,033 | 3/1998 | Burrows | 341/76 |
| 5,761,418 * | 6/1998 | Francis et al. | 709/201 |
| 5,793,964 * | 8/1998 | Rogers et al. | 709/202 |
| 5,870,559 * | 2/1999 | Leshem et al. | 709/224 |
| 5,958,008 * | 9/1999 | Pogresbisky et al. | 709/223 |
| 6,012,087 * | 1/2000 | Freivald et al. | 709/218 |
| 6,025,837 * | 2/2000 | Matthews, III et al. | 345/327 |
| 6,032,184 * | 2/2000 | Cogger et al. | 709/223 |

* cited by examiner

Primary Examiner—Matthew Luu
Assistant Examiner—Thu-Thao Havan
(74) Attorney, Agent, or Firm—Lowe Hauptman Gopstein Gilman & Berner

(57) ABSTRACT

A computer implemented method and system is disclosed for changing a display from a display of individual peak values of web site performance to a graphical display of web site performance, including at least one of the individual values. The individual peak values representing real-time web site performance are displayed. One of the individual peak values is selected. A graphical display of historical performance is displayed which includes the selected individual peak value.

16 Claims, 7 Drawing Sheets

DRILL-DOWN METHOD TO HISTORICAL DATA IN A PERFORMANCE MONITOR USING A PLATFORM INDEPENDENT PROGRAM

RELATED APPLICATIONS

This application is related to other patent applications assigned to the instant assignee and filed on event date herewith. Each of these applications is incorporated into the instant application in its entirety and the applications are entitled: "Method for Setting and Displaying Performance Thresholds Using A Platform Independent Program", "Method for Displaying Multiple Performance Measurements Of A Web Site Using A Platform Independent Program" and "Method For Calculating Capacity Measurements For An Internet Web Site".

1. Field of the Invention

The present invention relates generally to monitoring historical performance of a web site, and more particularly, to a drill-down method to historical data of a web site using a performance monitor using a platform independent program.

2. Background of the Invention

A performance monitor has two functions. First, the performance monitor should allow an administrator to monitor the real-time and historical performance of a web site. This includes the ability to track several different types of measurements such as hit rate and response time. Second, the performance should make it easy for the administrator to analyze the performance of a web site, especially if the performance has strayed beyond specified thresholds. Most of today's performance monitors only address the first role and provide little or no assistance to the administrator beyond simply displaying the performance data.

Further a need exists for a performance monitor that can display real-time data and display alerts. From the display the administrator can drill-down and easily view data which caused the alert.

SUMMARY OF THE INVENTION

The present invention addresses the role of providing the administrator with assistance in analyzing a web site's performance. The present invention provides a unique drill-down method that allows the administrator to go from a high-level measurement, such as a web site's peak hit rate, to a location on a detailed time-line graph where the value occurred. This enables the administrator to monitor the web site using only a handful of high-level measurements with the option of quickly drilling-down to detailed time-line based data when further analysis is required.

With the growing popularity of the Internet comes the ever increasing need for optimally performing web sites. Performance monitors have become an important tool in achieving that goal. The ability of performance monitors to display real-time and historical performance measurements allows the administrator to gain an understanding of how a web site is performing and make adjustments accordingly. However, displaying performance measurements is only half the picture because a tool is also needed to make it easy for the administrator to analyze the performance, especially when the performance of a web site is poor.

The focus of the present invention is to provide assistance to the administrator in analyzing a web site's performance over time. This has been achieved through a mechanism that allows the administrator to drill-down to more detailed historical data from higher level snapshot performance values. The administrator is thus able to easily monitor a web site's performance using only a handful of high level measurements. However, if performance goes astray the administrator can instantly drill-down to the point in time when the performance became unacceptable. The administrator is then able to view the measurements in the context of past and future performance as well as other related performance measures.

The present invention greatly enhances the administrator's ability to keep on top of a web site's performance by providing the ability to easily drill-down from high-level measurements to detailed historical data. It also helps keep the administrator from getting bogged down in detail performance data until circumstances warrant a deeper investigation.

The present invention provides a mechanism to quickly drill-down from a discrete measurement value to the location on a time-line graph where the value occurred. The three key components of the invention are 1) value boxes that display discrete performance measurements, 2) vertical white line value indicator, and 3) drill-down date/value label.

The drill-down mechanism of the present invention is most appropriately implemented in a tabbed environment where the value boxes are on a tab that displays real-time performance and the drill-down graph is on a tab that displays historical performance.

The value boxes that display discrete performance measurements such as low or peak values are the starting point for the drill-down. If the administrator sees a value that the administrator wants to investigate further, the administrator simply moves the mouse over the value box and clicks the mouse. This results in an immediate switch from the real-time tab to the history tab containing the drill-down graph.

The vertical white line value indicator is drawn on the spot on the time-line graph where the value occurred. This allows the administrator to easily see the value's location.

The drill-down date/value label is located just above the graph displays including the drill-down value and the date and time on the graph where the value occurred. This assists the administrator in easily determining the date and time of the drill-down value without having to calculate it from the vertical white line's position on the time-line scale.

It is, therefore, an object of the present invention to provide a drill-down method in which an administrator can view high-level measurements, such as a web site's peak hit rate, to a location on a detailed time-line graph where the value occurred.

It is another object of the present invention to provide a method of drilling-down to historical data in a performance monitor where peak and low values of performance measurements are displayed and the drill-down is started by selecting one of these values.

It is yet a further object of the present invention to provide a method of displaying historical data where the peak value is highlighted with a vertical line and the peak value is also displayed.

These and other objects of the present invention are achieved by a computer implemented method of changing a display from a display of individual peak values of web site performance to a graphical display of web site performance, including at least one of the individual values. The individual peak values representing real-time web site performance are displayed. One of the individual peak values is selected. A graphical display of historical performance is displayed which includes the selected individual peak value.

The foregoing objects are also achieved by a computer implemented method of changing a display of high level measurements representative of web site performance to low level measurements representative of the web site performance. The high level measurements are displayed. One of the high level measurements is selected. A graphical display of historical performance is presented which includes the selected high level measurement.

The foregoing objects are also achieved by a system for changing a display of individual peak values of web site performance to a graphical display of web site performance including at least one of the individual values. A user interface is provided that is configured to display at least one of the individual peak values and includes a corresponding number of buttons for selecting at least one of the individual peak values. A user interface is provided that is configured to display a graphical display of historical web server performance including the selected at least one individual peak value.

The foregoing objects are also achieved by an article including at least one sequence of machine executable instructions and a medium bearing the executable instructions in machine readable form, wherein execution of the instructions by one or more processors causes the one or more processors to display the individual peak values representing real-time web site performance. One of the individual peak values is selected. A graphical display of historical performance is presented which includes the selected individual peak value.

The foregoing objects are also achieved by a computer architecture including display means for displaying the individual peak values representing real-time web site performance. Selecting means are provided for selecting one of the individual peak values. Presenting means are provided for presenting a graphical display of historical performance which includes the selected individual peak value.

The foregoing objects are also achieved by a computer system including a processor and a memory coupled to the processor, the memory having stored therein sequences of instructions, which, when executed by the processor, causes the processor to perform the steps of display the individual peak values representing real-time web site performance. One of the individual peak values is selected. A graphical display of historical performance is presented which includes the selected individual peak value.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for a drill-down method and apparatus are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
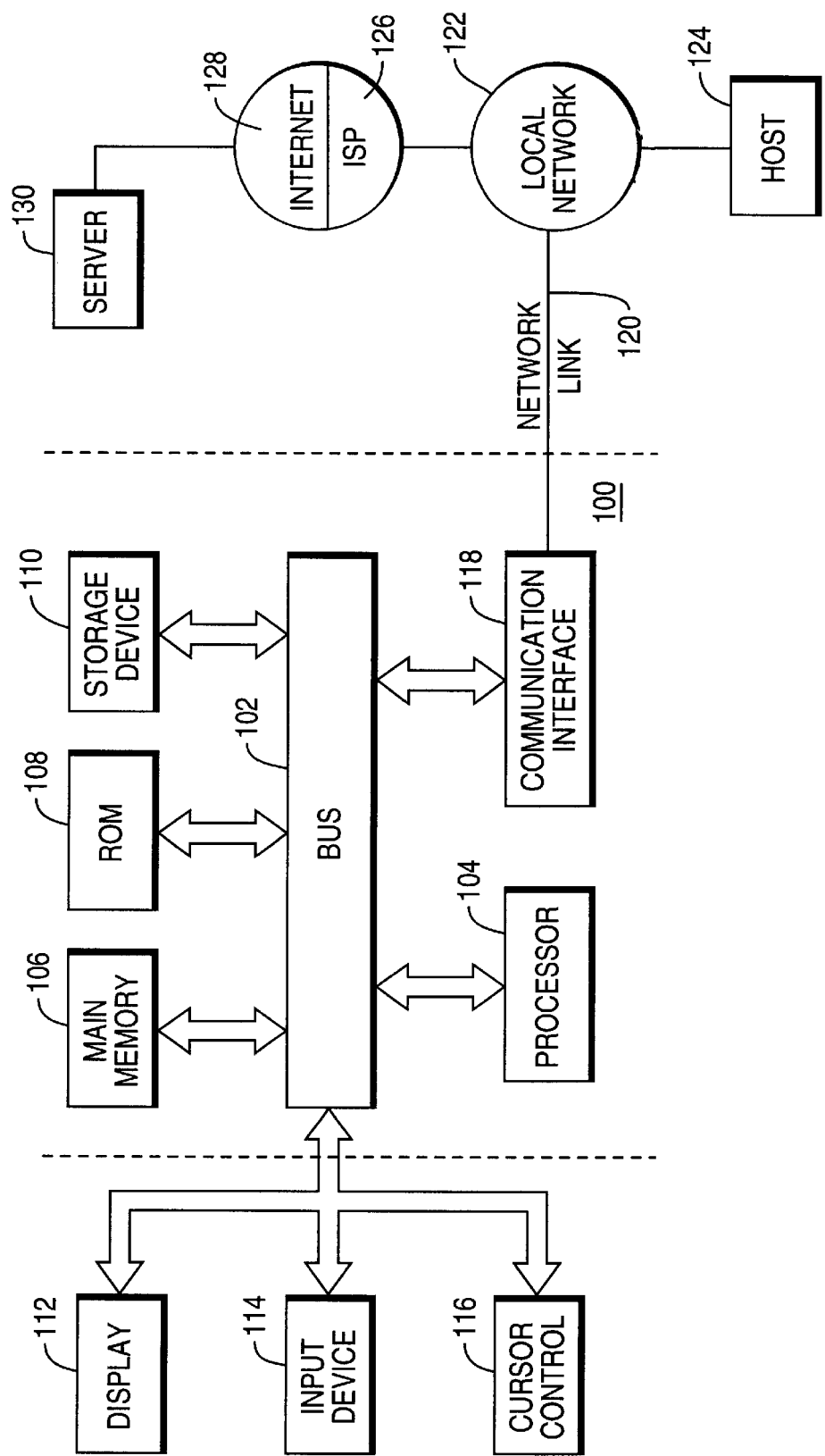
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display performance measurement data. According to one embodiment of the invention, performance measurement data and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals that carry digital data streams representing various types of information. Of particular note, the communications through interface 118 may permit transmission or receipt of the performance measurement data. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

Figure 2:
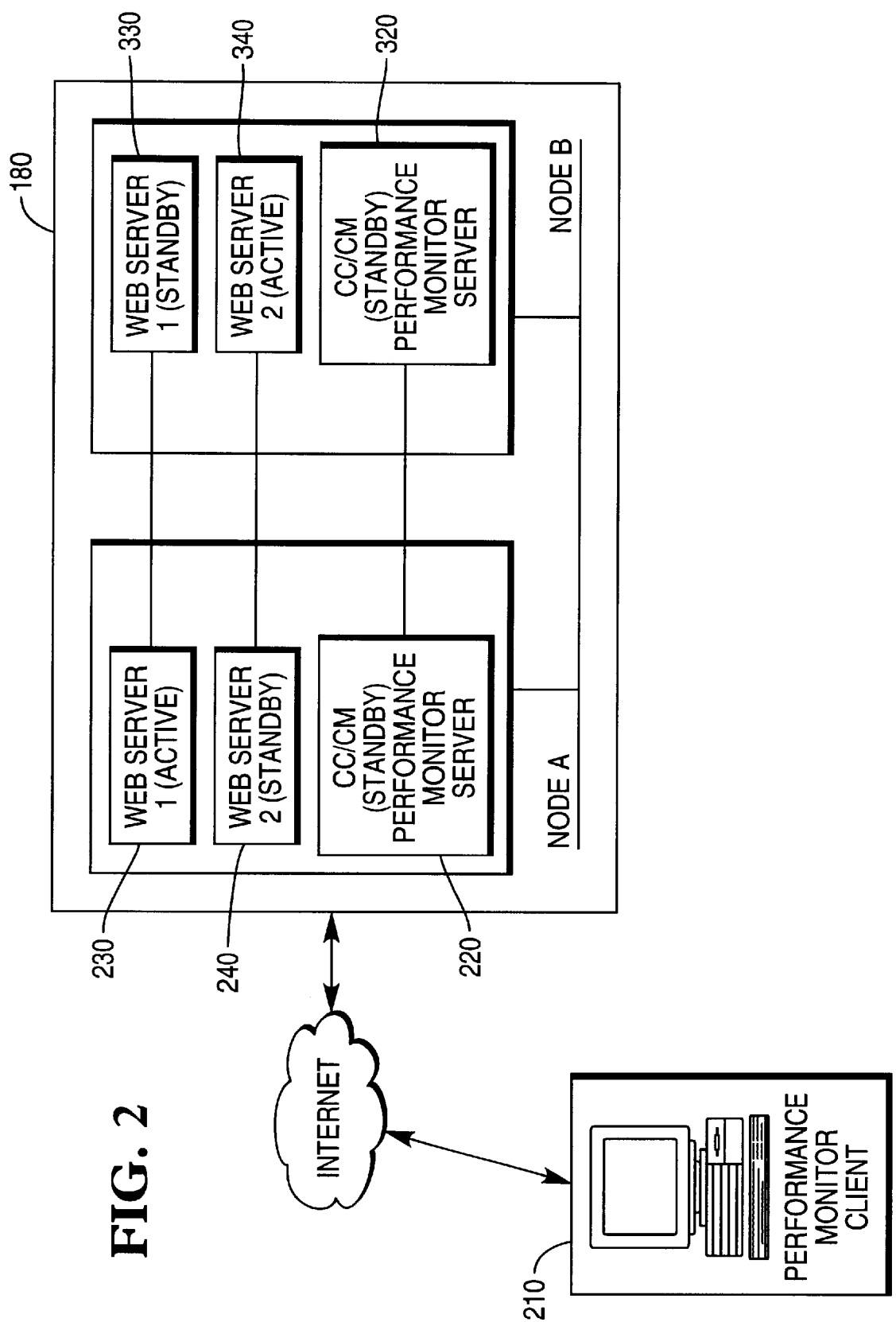
FIG. 2 is a schematic illustration of a web site and performance monitor client according to the present invention.

The high level logical architecture of a High Availability Internet Server (HAIS) 180 is depicted in FIG. 2. High availability means that connection requests by a client for a URL can be serviced because of the multiple web servers available for servicing the web site. The following definitions are used herein:

Client: Client is a computer serviced by the server which provides commands to the server.

Cluster: Collection of web servers (Single, HVS or SVS) treated as one web site with the same domain name.

Cluster Group: Grouping of web servers with identical configurations.

HTTP: Hypertext transfer protocol. At the beginning of a URL "http:" indicates the file contains hyperlinks.

Hardware: Virtual Server (HVS). Virtual web server is selected via IP address.

Hyperlink: A network address embedded in a word, phrase, icon or picture that is activated when you select the highlighted tidbit. Information about that item is currently retrieved to the client supporting a web browser.

HyperText Markup Language (HTML): HTML is the language used by web servers to create and connect documents that are viewed by web clients. HTML uses Hypertext documents.

Node: Hardware Platform.

Server: Machine which supports one or more clients and is part of the web. Any computer that performs a task at the command of another computer is a server.

Software Virtual Server (SVS): Virtual web server selected via domain name (Software Virtual Servers have same IP address).

TCP/IP: Transmission control protocol/Internet protocol. A packet switching scheme the Internet uses to chop route, and reconstruct the data it handles, from e-mail to video.

URL: Universal resource locator, a web document version of an e-mail address. URLs are very cumbersome if they belong to documents buried deep within others. They can be accessed with a Hyperlink.

Web Browser: A program running on a computer that acts as an Internet tour guide, complete with pictorial desktops, directories and search tools used when a user "surfs" the Internet.

Web Server: Single instance of web server software.

The HAIS server 180 appears as a single server or site on the Internet. Server 180 is connected to a performance monitor client 210 via the Internet. In the preferred embodiment, the interconnection between server 180 and performance monitor client 210 is provided by the Internet, although the present invention is also applicable to any environment wherein networked computers can communicate using a standard communications protocol (such as HTTP) and wherein platform independent programs can be downloaded and executed over the network. For the purposes of explaining the operation of the present invention, it is assumed that there is no network operating system that coordinates file exchange operations between server 180 and performance monitor client 210.

In the implementation depicted in FIG. 2, the user interface of the present invention is embedded within an application called the Performance Monitor, which, among other things, allows users to organize executable programs (Java applets) and standalone executables and non-executable files for displaying performance variables of a web site. As depicted in FIG. 2, the HAIS server 180 includes two nodes, A and B, each of which has a cluster of web servers. Node A includes a performance monitor server 220, a first web server 230 and a second web sever 240. Node B includes a performance monitor server 320, a first web server 330 and a second web server 340. As depicted in FIG. 2, web servers 230 and 340 are active and web servers 240 and 330 are on standby. Node A is in an active condition and Node B is in a standby condition. Each server 220, 230, 240, 320, 330, 340 can use computer system 100.

Each node A, B has a URL (Universal Resource Location) associated therewith and each node A, B comprises two (FIG. 2) or four (FIGS. 3 and 4) replicated web servers that make up an individual web site. Each web site can be accessed via its URL (Universal Resource Location). Each connection request for the URL is routed to a specific web server 230, 240, 330, 340 in the configuration based on a round-robin algorithm of currently available web servers. Availability is provided by computer availability software that determines if a web server in the configuration is active. If an active server fails, the availability software will activate a standby web server on another system to take over the failed web server.

Figure 3:
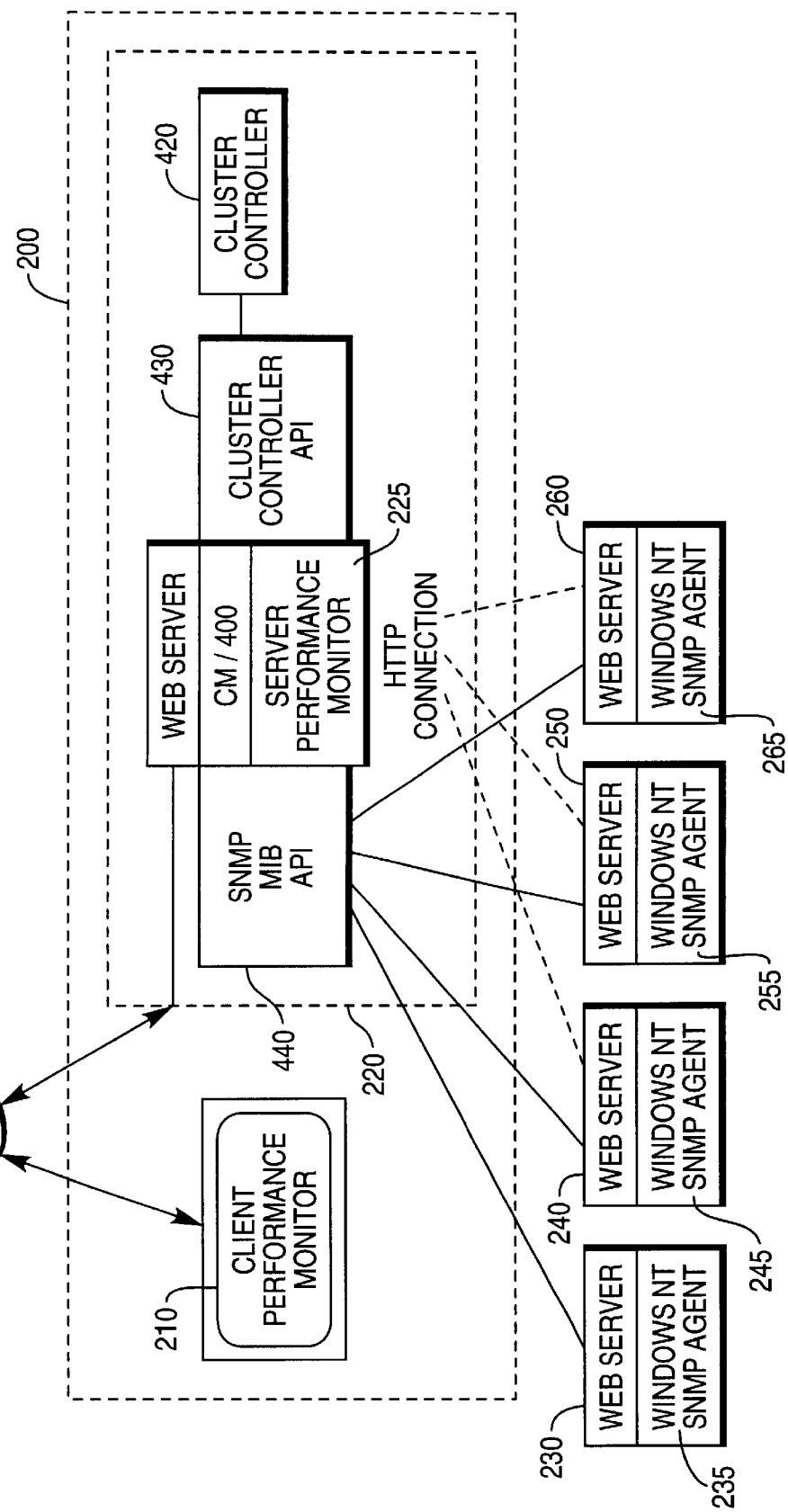
FIG. 3 is a logical architecture of the performance monitor according to the present invention and a cluster of web servers.

Referring now to FIG. 3, a performance monitor 200 is depicted according to the present invention. The performance monitor 200 is a computer software product that allows an administrator to assess the performance of Internet web sites. The performance monitor 200 includes a client side component 210 and a server side component 225. As depicted, the client side component 210 is coupled to the server side component 225 via the Internet. The client side component 210 of the performance monitor can use the disclosed computer system 100. As discussed in detail below, the client side component 210 is a platform independent program and is preferably a Java applet which receives requested performance measurements from the server side component 225 and stores the performance measurements in a data cache for display.

The performance monitor 200 collects three basic measurements:

(1) Hit Rate: is the rate at which requests are being received by a web server during a measurement interval. Hit rate may be measured in hits per second, hits per minute or hits per hour. The time interval should be adjusted by the administrator based on the volume of requests that a web server receives. In the case of a web site, the rate is calculated using an average of the number of hits each web server receives during a measurement interval.

(2) Response Time: is the time it takes in milliseconds for a web server to respond to a client request during a measurement interval. For web sites, it is the average response time for all the servers in the cluster.

(3) CPU Utilization: is the number that represents the percentage of time that the CPU is doing useful work on a node running a web server. For web sites, it is the average of the node's CPU utilization numbers.

Residing on each web server 220, 320 is a cluster manager 400, a cluster controller 420, and the performance manager component 225. For simplicity, only web server 220 is depicted in FIG. 3 although web server 320 is similarly arranged. The cluster manager 400 and the cluster controller 420 are each computer software that provides functionality and together administer the cluster(s) of servers and provide performance monitoring and server availability. A cluster manager console (not shown) provides the single operational view of the HAIS cluster.

The cluster manager 400 on each server is the main administrative interface for each of the web servers 220, 320. The cluster manager 400 includes a set of HTML pages, Common Gateway Interface (CGI) programs, and Java applets and preferably runs as a Netscape FastTrack web server. The CGI programs are a platform independent interface used by an HTTP server to run external programs. A CGI program receives client requests and responds with the requested information. The cluster manager 400 provides functions such as configuring the clusters, enabling and disabling web servers within a cluster, and monitoring the cluster performance. The cluster manager 400 maintains the overall configuration of the clusters, such as clustering group and cluster information, server information, logging information and performance monitoring information. This information is stored in a hais.conf file 530 (FIG. 5) that resides in a file system on a shared drive.

The performance monitor 200 is dependent on the cluster manager 400 for storing an HAIS IP Alias and HAIS Root Path values in the Registry. The following Registry entries can be used:

| HAIS Parameter | Registry Entry |
|---|---|
| HAIS IP Alias | HKEY_LOCAL_MACHINE/SOFTWARE/NCR/HAIS/IPALIAS |
| HAIS Root Path | HKEY_LOCAL_MACHINE/SOFTWARE/NCR/HAIS/HAIS_ROOT |

Also stored under the file system are the cluster controller 420 configuration files (cluster.conf and lbxfer.conf), the performance monitor 225 configuration files (pm.conf), and node log files (such as cnamed.log, lbxfer.log, and CMLog).

The cluster controller 420 is responsible for maintaining an "available host table". This table identifies which servers in the various clusters are available. The cluster controller 420 determines the availability of servers by polling the servers at regular intervals to determine if each of the servers is still active. The cluster controller 420 acts like a DNS server, responding to name resolution requests with the IP addresses of available web servers in the HAIS cluster. A distributed naming service (DNS) provides information about the IP addresses and domain names of all computers on a network. The DNS server translates symbolic, easy to remember names into numeric IP addresses. Commonly used on the Internet, DNS domains may be based on geography or organization. The topmost domain is standardized and includes these domain names: com (commercial organization), edu (educational institution), gov (government agency), int (international organization), mil (United States military), net (networking organization), and org (nonprofit organization).

Figure 5:
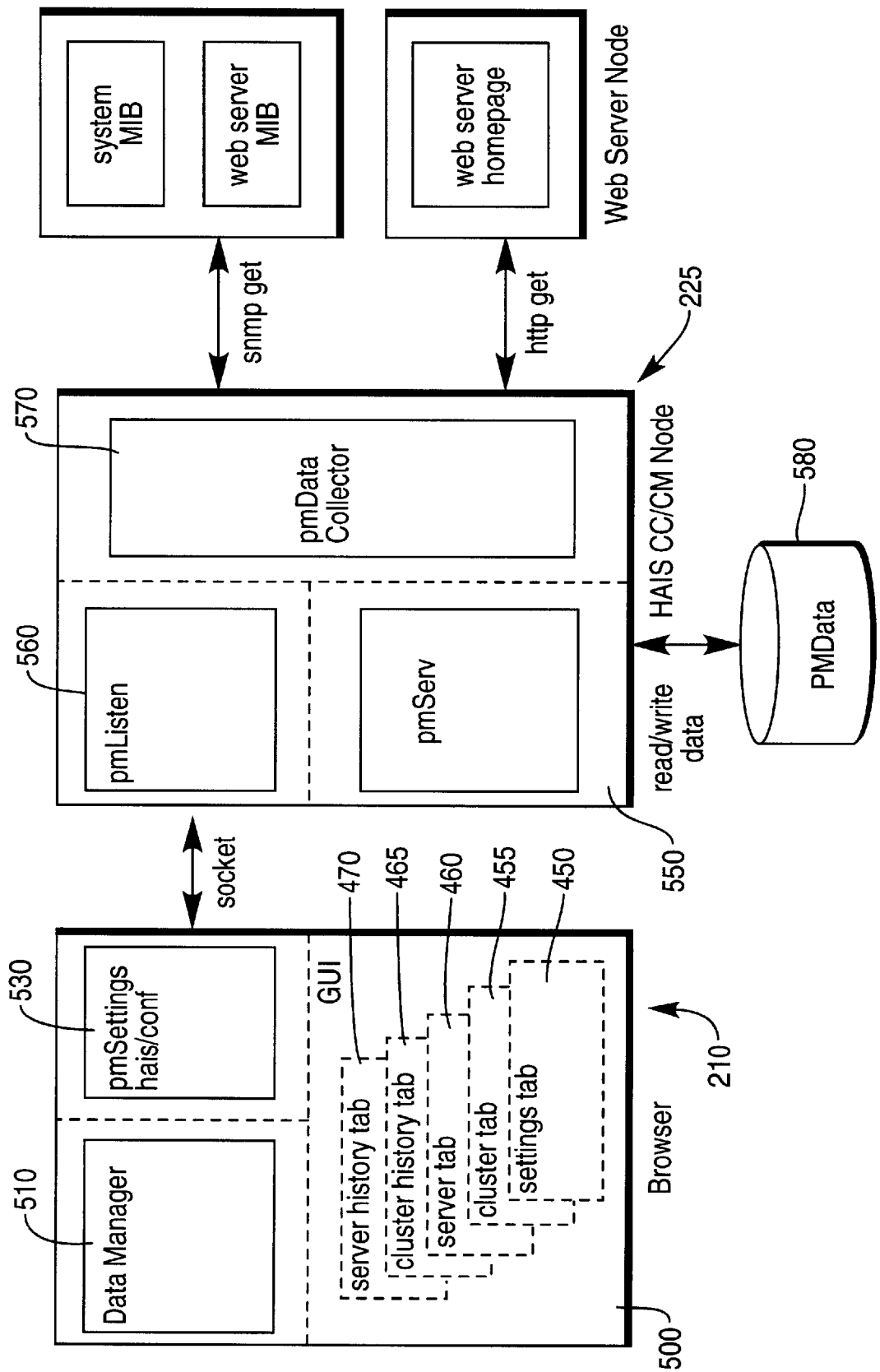
FIG. 5 is a logical architecture of a client side component and server side component connected to a web server node.

According to the present invention, the server side component 225 of the performance monitor 200 monitors the web servers 230, 240, 330, 340 performance and the client side component 225 arranges and displays the information graphically via Java applets. Performance information, such as CPU utilization, web server response time, and web server hit count, is gathered by the server side component 210 of the performance monitor 200 to determine web server performance. The client side component 210 can then request that the server side component 225 forward requested information to the client side component for display by the grahical user interface or GUI 500 (FIG. 5).

The client side component 210 of the performance monitor (PM) 200 uses Java applets for displaying the web server performance data. The Java applets interact with the server side component 225 running on each of the web servers 220, 320 (also called a CM/CC/PM node). Performance information, such as CPU utilization and web server hit count is gathered through a SNMP MIB API 440. Information, such as web server response time is obtained through HTTP connections to the web servers. The server side component 225 of the performance monitor 200 interacts with the cluster controller 420 through a cluster controller API 430, get$_{13}$subdomain$_{13}$hosts. The server side component 225 uses the "available host table" returned from the API 430 as a basis of which servers are available for gathering performance data. The server side component 225 of the performance monitor 200 also utilizes Java object classes provided by the cluster manager 400, through a Java socket connection (FIG. 5) back to the cluster manager 400, to obtain the current cluster configuration. A socket is a portion of an internetwork address within a network node that represents the destination of an Internetwork Packet Exchange (IPX) packet.

The server side component 210 of the performance monitor 200 calls a cluster controller API 430 (get$_{13}$subdomain$_{13}$hosts) to obtain the available host table for the cluster being monitored and interacts with an SNMP MIB 235, 245, 255, 265 (FIG. 3) on each of the web servers 230, 240, 250, 260, respectively, to gather much of its data. To collect the performance data, the server-side performance monitor component 225 uses a Simple Network Management Protocol (SNMP) Manager API to perform SNMP Get Next requests to retrieve the perfMIB. A Management Information Base (MIB) is a database of network-management information and objects used by the Common Management Information Protocol (CMIP) and the SNMP. Each network management service has its own set of objects for different types of devices or for different network management protocols (i.e., Windows NT system MIB), the Netscape MIB, and/or the HTTP MIB (from Microsoft IIS).

CPU Utilization

The performance monitor 200 relies on the presence of the Windows NT PerfMIB to retrieve the CPU utilization performance counter. This counter is used to calculate the CPU utilization performance measurement. The Windows NT SNMP Performance Counter Agent extension makes the performance data counters available through SNMP.

To retrieve the CPU utilization counter the following registry entries are created:

HKEY$_{13}$LOCAL$_{13}$MACHINE/SOFTWARE/
  MICROSOFT/PerformanceAgent/ CurrentVersion:
  % SystemRoot%System32%perfmib.dll
HKEY$_{13}$LOCAL$_{13}$MACHINE/CurrentControlSet/Services/
  SNMP/ Parameters/ExtensionAgents
  PerformanceAgent: SOFTWARE/Microsoft/
    PerformanceAgent/ CurrentVersion
  The InstallShield also places the perfmib.dll and the
    perfmib.ini into the %SystemRoot%System32%folder
    (this is typically c:\winnt\system32).

Web Server Hit Count

The performance monitor 200 supports both the Netscape Enterprise Server and the Microsoft Internet Information Sever, IIS. It relies on the presence of the Netscape MIB when interacting with the Enterprise Server to retrieve the total requests MIB variable. The total requests counter is used to calculate he hits/sec performance measurement. The performance monitor 200 cannot support the Netscape Fastrack Server as it does not support the Netscape MIB. Information on how to set up the SNMP master agent and enable the SNMP subagent is located in the Netscape Enterprise Server Administrator's Guide. The hit rate is extracted from either the Netscape MIB or the HTTP MIB as appropriate.

The performance monitor 200 relies on the presence of the HTTP MIB when interacting with the IIS to retrieve the TotalGets MIB variable. This counter is used to calculate the hits/sec performance measurement. The MIB files (located in the sdk folder of IIS CD ROM) need to be compiled using the MIB compiler that comes with the SNMP software before using them with the Windows NT SNP service. The services to be monitored (HTTP) must be started before the SNMP service. Once the SNMP service is started on the nodes A, B and any other nodes that are running web servers, then the performance monitor 200 can be started. Compilation of the MIB and SNMP service startup are implemented as an administrative script that is run prior to starting the performance monitor 200. The performance monitor 200 also uses the standard SNMP protocol to retrieve performance data from the web servers within a cluster.

To retrieve web server hit counter from the Microsoft IIS web server the following registry entries are created:

HKEY$_{13}$LOCAL$_{13}$MACHINE/SOFTWARE/Microsoft/
  SNMP Agent/Current Version:
  %SystemRoot%System32%httpsnmp.dll
HKEY$_{13}$LOCAL$_{13}$MACHINE/CurrentControlSet/Services/
  SNMP/Parameters/ ExtensionAgents
  Http-Agent:SOFTWARE/Microsoft/Http-Agent/
    CurrentVersion
  The InstallShield also copies the httpsnmp.dll from
    %SystemRoot%System32%/server into the
    %SystemRoot%System32% folder (this is typically
    c:\winnt\system32).

To retrieve the web server hit counter from the Netscape Enterprise Server HAIS relies on the installation of the Enterprise Server 3.0 software to create the following registry entries:

HKEY$_{13}$LOCAL$_{13}$MACHINE/SOFTWARE/Netscape/
  Enterprise/3.0/SNMP/ CurrentVersion:
  c:\netscape\suitesport\bin\snmp.dll
HKEY$_{13}$LOCAL$_{13}$MACHINE/CurrentControlSet/Services/
  SNMP/Parameters/ ExtensionAgentsSNMPAgent:
  SOFTWARE/Netscape/Enterprise/3.0/SNMP/ Current-
  Version Response time is measured by issuing a HTTP GET request to each web server in a monitored cluster and timing how long it takes to receive a response.

Figure 4:
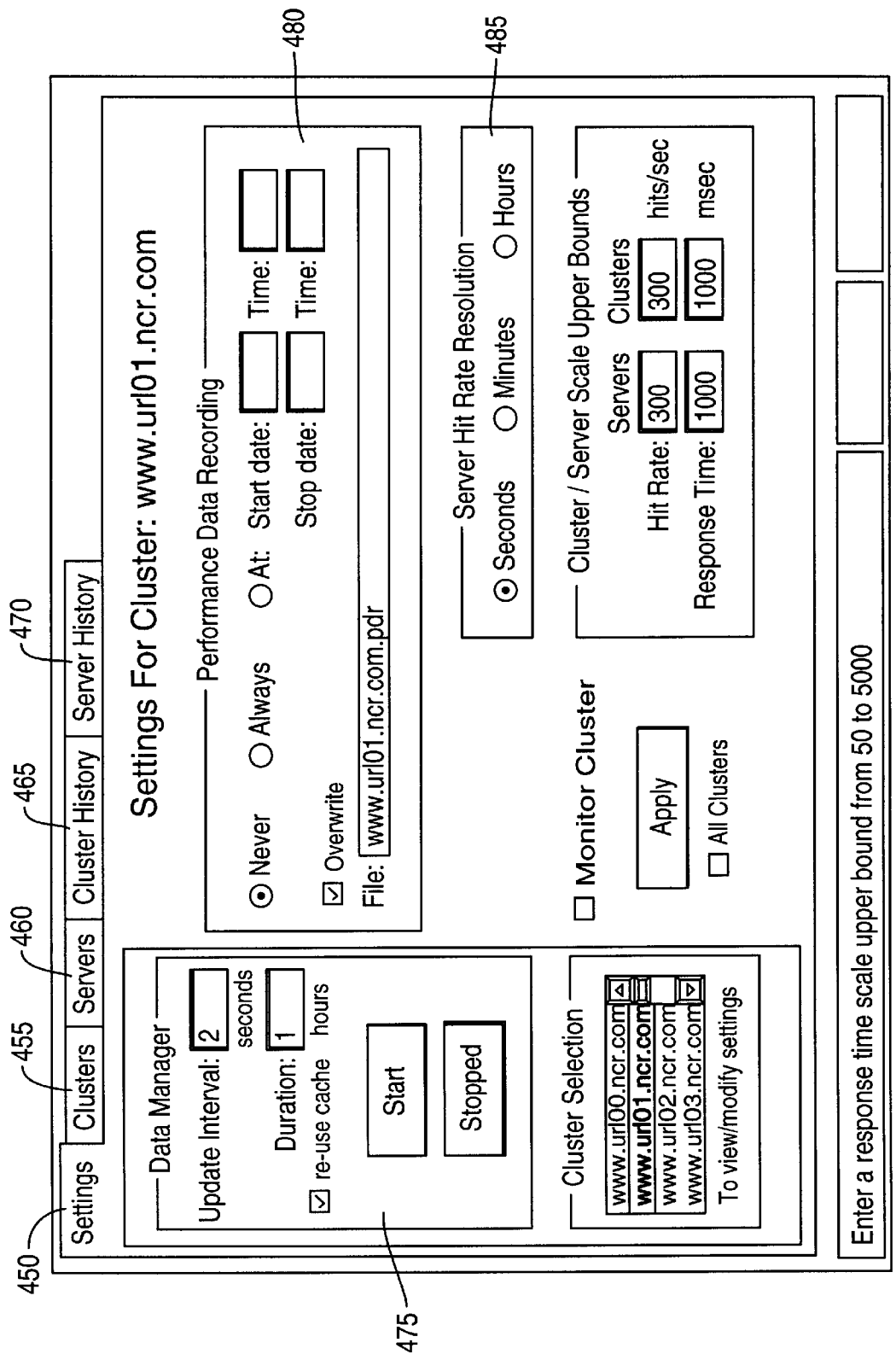
FIG. 4 is a view of a graphical user interface.

Referring now to FIGS. 4 and 5, the performance monitor offers several views of the performance of the monitored web sites. Each tab presents a different view of the performance of clustered web servers. The user can extract the performance data the user requires (depending on the selected view) from the data cache. By tabbing through the GUI 500, performance measurements can be displayed by Cluster (i.e., Web site) 455, Server (i.e., web server) 460, Cluster History 465, and Server History 470. A settings tab 450 is used to display a settings view depicted in FIG. 4.

The performance monitor 200 is provided as part of an administrative interface that provides process control, configuration, and messaging logging services for the environment as well as performance monitoring. Administrators can tailor how the performance monitor gathers performance measurements. General settings of a data manager in area 475 include:

Update interval in allows administrators to set how often the performance monitor collects performance measurements. The update interval can be set to any range, from a few seconds to every five minutes.

Duration allows administrators to define how long the performance monitor will collect performance measurements. The duration can be set from a single hour to more extended periods.

Settings specific to an individual web site include:

Data recording settings in area 480 to allow later playback of measurements.

Hit rate resolution setting in area 485 that measures web server access rates in seconds, minutes, or hours.

Scale settings in area 490 to change how measurements are displayed.

Threshold settings to define when performance is outside of normal expectations. Threshold settings are also used to calculate the capacity measurement for a set of web servers.

Functionality is provided by the client side component 210 using a Java applet that implements the graphical user interface or GUI 500. The GUI 500 is supported by a data manager 510 which is responsible for collecting and storing performance measurements. A data cache is filled with performance data by a server side program, pmServ 550. The performance data is comprised of the hits/sec of each web server, the response time of each web server, and the idle time of each node of the cluster. The performance data can be displayed in real-time or historical data can be displayed. The incoming performance data is used to update the minimum, maximum and averages of each performance variable of each web server in the cluster as well as the cluster as a whole. Cluster data is created by calculating the average of each performance variable using the clustered web server measurements. The time the measurements are collected (update time) is stored with the measurements.

To support the cluster view 455, the data manager 510 keeps track of the current, average, high, and low values of each performance measurement for each web site being monitored. The data manager 510 compares the previous high and low values of each performance measurement and replaces these values and the update time if the current collected measurement exceeds the previous values (either higher or lower as appropriate). The data manager 510 also calculates a running average of each performance measurement.

To calculate the current, average, high and low capacity measurements, the data manager 510 maintains sets of measurements for a web site containing each performance measurement gathered at an update interval. To compare previous high and low capacity measurements, the measurements or the previous and current are added and then compared. If the sum of the current measurements exceeds the previous measurement sum, then the current set of measurement is stored along with their associated update time. To maintain average capacity measurements, the data manager creates a set of measurements from the current averages of each performance measurement for the web site.

To support the cluster history view 465, the data manager 510 stores all of the collected measurements into a data cache. The performance measurements are organized by web site. Each element of the data cache consists of a table of web site measurements. Each web site's entry in the table contains the hit count, response time and CPU utilization measurements for each web server in the web site that were collected at a specific update interval.

To support the server view 460 and server history view 470, the data manager similarly collects and stores data for each web server rather than for the entire cluster.

The GUI 500 uses an interface provided by the data manager 510 to retrieve measurements for display. When the data manager 510 provides capacity measurements for display in the cluster view 455 by the GUI 500, it calculates the current high, low and average capacity using the set of measurements it has stored for capacity measurements. When the data manager 510 provides capacity measurements to the GUI 500 for use in the cluster history view 465, the relevant measurements of the web servers are retrieved from the data cache. Web site measurements are calculated (i.e., average of web server measurements). These averages are then used to calculate capacity.

Operation

A logical architecture of the operation of the performance monitor 200 is depicted in FIG. 5. The performance monitor 200 includes the client side component 210 which includes the GUI 500, the data manager 510 and a PM setting 530 which includes the HAIS.conf file. The client side component 210 is connected via a socket to the server side component 225 which includes a pmServ thread 550, a pmListen thread 560, and a PM data collector thread 570. Each web server node 230, 240, 330, 340 includes its own system MIB, a web server MIB and a web server home page. Only one web server node is illustrated for clarity.

A performance monitor server-side program pmServ 550 is started through a cluster manager 400 process control applet. When a performance monitor start button is pushed, a Cluster Manager Computer Graphics Interface (CGI) program is invoked that calls a Windows NT API, StartService to start the pmServ program 550. The server-side component 225 includes a component called pmServ (set up as a NT service) resides on the same node as the cluster manager 400 and cluster controller 420 components. When monitoring begins, and the client side component 210 registers interest in receiving performance data updates for specified clusters, a start of activity time is set at this moment. The performance data is collected from the web servers in the specified cluster(s). The client side component 210 requests data of the server-side program 225 at a set time interval. If the performance data is to be saved, the collected data is written to a file. The main thread of pmServ 550 monitors a pmListen thread 560 and responds to isalive events sent to it from an availability watch program. The main thread of pmServ 550 starts the pmListen thread 560.

The pmListen thread 560 of pmServ 550 listens for requests from the PMDataManager 510. The requests that can be processed include setting up data collection for one or more clusters, setting up data recording for one or more clusters, starting data collection, stopping data collection, and getting playback data. When data collection is started, the pnListen thread 560 creates a data collection thread for each cluster that is being monitored. When pmServ 550 receives a stop data collection request, pmServ 550 stops each data collection thread. If data playback is requested, the pmListen thread uses the current data recording configuration to determine where to get the recorded data. When data is requested by the PMDataManager 510, the pmListen thread 560 retrieves the current performance data from pmServ data structures (not shown; placed there by each of the data collection threads 570).

The settings tab 450 and view is initially displayed. The administrator sets up performance monitoring for selected clusters using view displayed by cluster tab 455. The cluster 455 and server 460 views display 'LEDs' to depict current performance. The cluster history 465 and server history 470 performance views display time graphs to depict past performance.

The performance monitor settings chosen in the settings window of FIG. 4, are managed through the use of the Cluster Manager's HAISConfig object 530 (FIG. 5). The HAISConfig object has the settings embedded within it. Whenever the settings tab 690 is selected, the current settings are retrieved from the HAISConfig object. When the settings are changed by the administrator, the HAISConfig object is modified with the affected settings values.

(1) When a cluster is selected to be monitored, the PMDataManager 510 sends a set of requests (used to configure and start data collection) to the pmServ 550 component's pmListen thread 560. The PMDataManager 510 then makes requests to get collected data from the pmServe 550 at a regular interval. The data returned is placed into the PMDataManager's data cache 510. The maximum number of entries in the data cache is 8640. This is determined by the interval and duration settings. The PMDataManager 510 maintains the data cache while the performance monitor 200 is active. This includes the minimum, maximum, and averages of the performance data measurements for each cluster, and each server within a cluster. Whenever the cluster, server, cluster history, or server history tab is selected, the PMDataManager 510 is queried for data relevant to the selected tab.

(2) The data collector threads 570 are used to collect current performance measurements for a specified cluster. It uses the cluster controller 420 to get the currently available servers in the specified cluster. Then it uses the SNMP Management API 440 to get the current hit count and the current CPU time for each currently available web server. The data collector 570 issues a HTTP GET request to retrieve the home page of each server in the cluster and measures the amount of time it takes to receive it. It places these values in the pmServ data structures.

If the client side component 210 is destroyed, the data cache will be cleared. If data collection is not complete (this is determined by the current performance monitor settings), the data collector continues to collect data if data recording is active. The servers 220, 230 will continue to be ready to receive requests from the client side component 210 to resume data collection, but since the applet no longer exists, the data is not placed into the data cache.

If the client side component 210 is stopped, the data cache will not be updated for the period of time the applet is stopped. When the client side component 210 is resumed, and data collection is still occurring, the data cache is updated with current performance measurements.

If the client side component 210 is started while data collection is still occurring, the servers 220, 230 will notify the client side component 210 of data updates, but now the data cache is updated with current performance measurements. The start of activity is reset and the average, low and peak values of each performance variable are recalculated based on the new start of activity time.

If the client side component 210 is inactive when data collection is scheduled to stop (this only occurs when data recording is active), the server-side program terminates without intervention from the administrator. When the client side component 210 is started after data collection is complete, the settings tab will be initially displayed with values previously stored in a configuration file. The administrator can then make changes to the settings and start performance monitoring.

A data collection protocol is used to make requests and receive responses between the client side component 210 of performance monitor 200 and the server side 225 of the performance monitor 200. Requests and responses are represented as strings. Data is passed between the client side 210 component (implemented in Java) and served side component 225 (implemented in C). The requests and responses are not encoded because there is no security requirement.

To begin data collection, the client side 210 component bundles together set data collection, set data recording and start data collection requests, and sends the requests to the server side component 225. If the server side component 210 responds with an OK response, all three requests have been processed successfully. The client side component 210 can then send get data requests at user-specified intervals. The server side component 225 responds with performance measurements from the servers in each cluster that is currently being monitored. When data collection is active, the client side component 210 may also make set data recording or get playback data requests to the server side component 225. To terminate data collection, the client side component 210 sends the stop data collection request to the server side component 225. If server side component 225 cannot process a request for any reason, it responds with a not OK.

The following is an example of a request/response sequence:

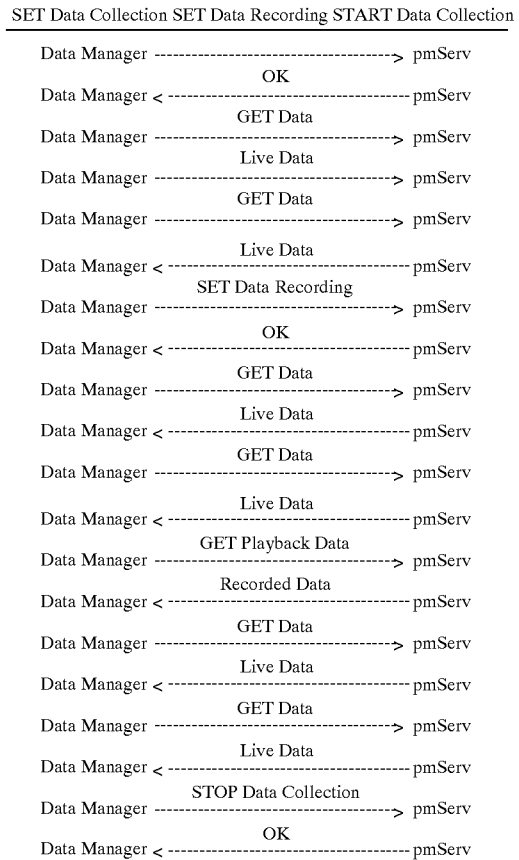

-continued
SET Data Collection SET Data Recording START Data Collection

```
Data Manager ----------------------------------> pmServ
                         OK
Data Manager <---------------------------------- pmServ
                      GET Data
Data Manager ----------------------------------> pmServ
                      Live Data
Data Manager <---------------------------------- pmServ
                      GET Data
Data Manager ----------------------------------> pmServ
                      Live Data
Data Manager <---------------------------------- pmServ
                      GET Data
Data Manager ----------------------------------> pmServ
                      Live Data
Data Manager <---------------------------------- pmServ
                      GET Data
Data Manager ----------------------------------> pmServ
                      Live Data
Data Manager <---------------------------------- pmServ
                STOP Data Collection
Data Manager ----------------------------------> pmServ
                         OK
Data Manager <---------------------------------- pmServ
```

To facilitate request and response parsing, a variety of separators are used, including:

"dollar sign"—separates requests
"colon"—terminates request type
"dash"—terminates interval
"exclamation point(s)"—separates clusters
"semi-colons"—separates servers
"spaces"—separates specific server information
"commas"—separates recording or playback settings Set Data Collection request sends all the information necessary to initialize pmServ's global data structures that regulate the collection of snmp statistics that are used as performance measurements.

SETDC:<interval>-<cluster name>=<node name> <server name> <server type>;<node name> <server name> <server type>;!$\n.

interval—number of seconds between taking measurements, taken from interval specification in Settings Tab.

cluster name—subdomain used by set of clustered web servers, taken from subdomain field in the CM Cluster Configuration Cluster Group Definition.

node name—name of system in HAIS environment, taken from node name/server identifier field in the CM Cluster Configuration Server Definition.

server name—actually the switchable name that a web server uses to get http requests, taken from the IP address in the CM Cluster Configuration Server Definition.

server type—specifies either Netscape or IIS, taken from the CM Cluster Configuration Server Definition.

Note that "!" characters are used to separate cluster information and ";" characters are used to separate server information.

Server may respond with OK\n if successful or NOTOK\n if not.

The Set Data Recording request sends all recording information necessary to initialize global data structures that pmServ uses to control recording of performance measurements. Data recording attributes apply to individual clusters.

SETDR:<cluster name>=<recording mode>,<filename>, <overwrite mode>,<start time>,<end time>,!$\n cluster name—subdomain used by set of clustered web servers, taken from subdomain field in the CM Cluster Configuration Cluster Group Definition.

recording mode—specifies when data recording should take place, NEVER, ALWAYS, or AT, taken from the Settings Tab.

filename—where to write performance measurements, taken from the Settings Tab.

overwrite mode—specifies whether to append to the end of the files (NOOVERWRITE) or to reposition the file to the beginning (OVERWRITE), taken from the Settings Tab.

start time—when to begin data recording, taken from the Settings Tab.

end time—when to end data recording, take from the Settings Tab.

Note: "!" characters separate individual cluster's data recording attributes. Not all attributes may be specified in a Set Data recording request but command separators are still used. For example:

SETDC:<cluster.sandiegoca.ncr.com>=NEVER,,,,,!

Server may respond with OK\n if successful or NOTOK\n if not.

The Start Data Collection request causes pmServ to start its data collection threads.

STARTDC:$\n

Server may respond with OK\n if successful or NOTOK\n if not.

The Get Data request is issued at regular intervals by the applet. It causes pmServ to get the current performance measurements from its global data structures and build a response.

GETDATA:$\n

Server response(s):

<cluster name>:<server name>=<hits> <response time> <CPU utilization>; ...;!<null>.

cluster name—taken from an entry in the cluster name table.

server name—taken from an entry in a clusters server table.

hits—taken from entry in a cluster's server table.

response time—taken from entry in a cluster's server table.

cpu utilization—taken from entry in a cluster's server table.

Server may respond with NOTOK\n, if the request cannot be performed.

Note that "!" characters are used to separate cluster information and ";" characters are used to separate server information.

The Get Playback Data request is used by the applet to retrieve recorded information from a data recording file.

GETPBDATA:<cluster name>=<filename>,<interval>, <start time>,<end time>,$\n.

cluster name—subdomain used by set of clustered web servers, taken from subdomain.

field in the CM Cluster Configuration Cluster Group Definition.

filename—file from which to read performance data, taken from Settings Tab.

interval—number of seconds between measurements, taken from Settings Tab.

start time—gets recorded data after the start time, taken from Cluster History or Server History Tabs.

end time—gets recorded data before the end time, derived internally in the DataManager's loadCache routine.

server response(s):

<cluster name>: <server name>=<hits>,<response time>, <cpu utilization>; ...!<null>NOTOK\n Note that "!" characters are used to separate cluster data records and ";" characters are used to separate server performance measurements.

The Stop Data Collection request causes pmServ to terminate its data collection threads.

STOPDC:$\n

Server responds with OK\n, if the request is successful, and NOTOK\n, if the request cannot be performed.

Display of Performance Measurements

Figure 6:
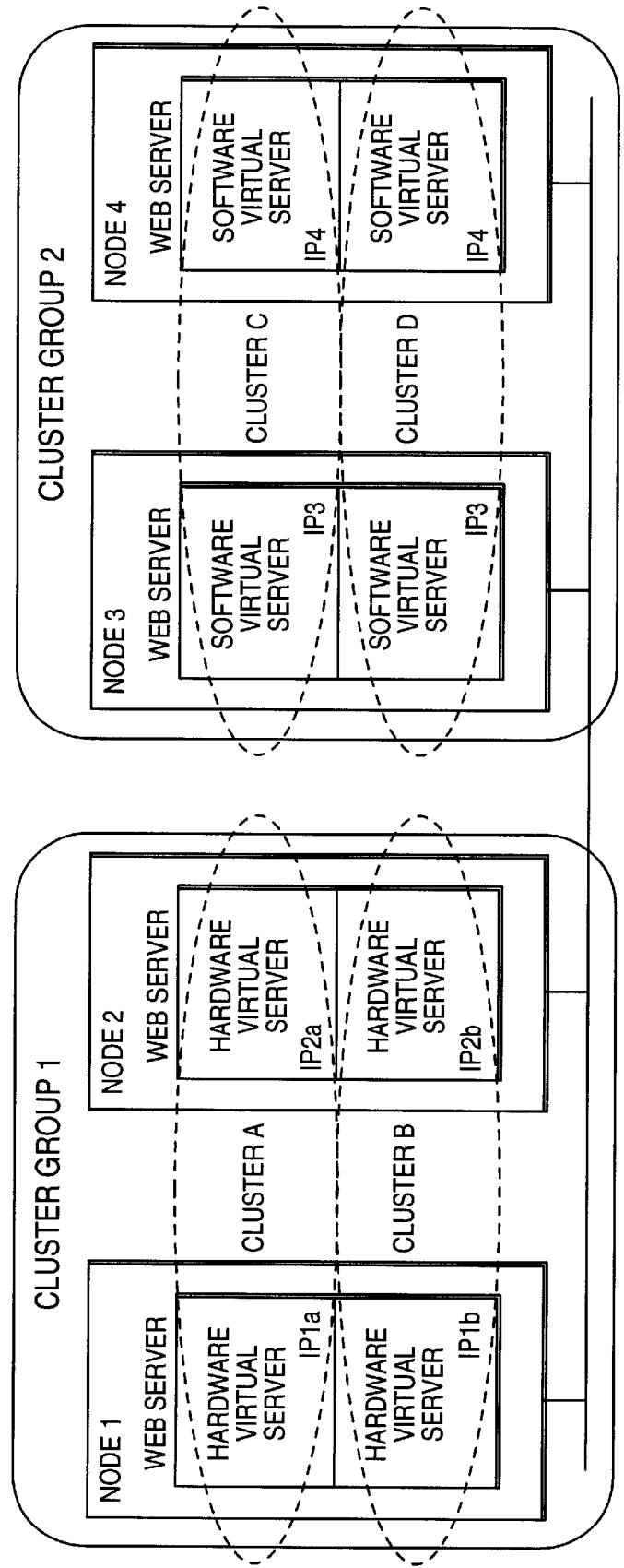
FIG. 6 is a diagram of a hardware virtual server cluster and a software virtual server cluster.

The clusters usable for nodes A, B are depicted in greater detail in FIG. 6. Because the Netscape Enterprise Server and Microsoft IIS support the concept of hardware virtual servers (i.e., having a single web server support many different IP addresses, each a different virtual server) and software virtual servers (i.e., having a single web server support different sub-domains through the same IP address), a Cluster Group identifies replicated web servers.) Two cluster groups 1, 2 include four clusters A, B, C, D and four nodes 1, 2, 3, 4. Cluster group 1 includes nodes 1, 2. Cluster group 2 includes nodes 3, 4. Node 1 includes two hardware virtual servers IP1a and IP1b. Node 2 includes two hardware virtual servers IP2a and IP2b. Node 3 includes two software virtual servers IP3. Node 4 includes two software virtual servers IP4. Each web server is identically configured with the same hardware virtual servers or software virtual servers. Each virtual server can still belong to a different cluster or sub-domain. The following addresses are used for each node or cluster A, B, C, D:

Cluster A: www.a.com=HVS(1P1a)+HVS(1P2a)

Cluster B: www.b.com=HVS(1P1b)+HVS(1P2b)

Cluster C: www.c.com=SVS(1P3,"c.com")+SVS(1P4, "c.com")

Cluster D: www.d.com=SVS(1P3,"d.com")+SVS(1P4, "d.com"

For example, hardware virtual servers IP1a and IP1b could be used as web servers 230, 240 and hardware virtual servers IP2a and IP2b could be used as web servers 330, 340. Alternatively, software virtual servers IP3 and IP4 could be used as web servers 230, 240; 330, 340, respectively.

The present invention as implemented on a Windows NT platform is expected to support configurations that have virtual web servers. Netscape Enterprise Servers support hardware and software virtual servers, while the Microsoft IIS supports hardware virtual servers only. The performance monitor retrieves the hit rate statistic from web server MIBs. The web server's MIBs (both Netscape's and Microsoft's) are not structured to provide statistics for individual hardware virtual servers. This means that for some configurations the Performance Monitor Cluster and Server performance views may be misleading because the capacity and hits/sec performance values reflect the entire 'physical' web server. The following table illustrates which HAIS configurations are unaffected and which are affected.

|  | Non-Partioned ES or IIS | ES HVS | ES SVS | IIS HVS |
|---|---|---|---|---|
| 2 node, single cluster | unaffected | Na | na | Na |
| 2 node multiple cluster | na | Un-affected | affected | Affected |
| 4 node single cluster | unaffected | Na | na | Na |
| 4 node 2 cluster | unaffected | Un-affected | affected | Affected |
| 4 node multiple cluster | na | Un-affected | affected | Affected |

Note: ES-Enterprise Server, IIS-Internet Information Server, HV-hardware virtual server, SVS-software virtual server.

Having explained the hardware, logical architecture and method of collecting and gathering performance measurement data, the present invention can be described as performed by the client side component 210 in drilling-down and displaying historical measurements for an Internet web site.

Figure 7:
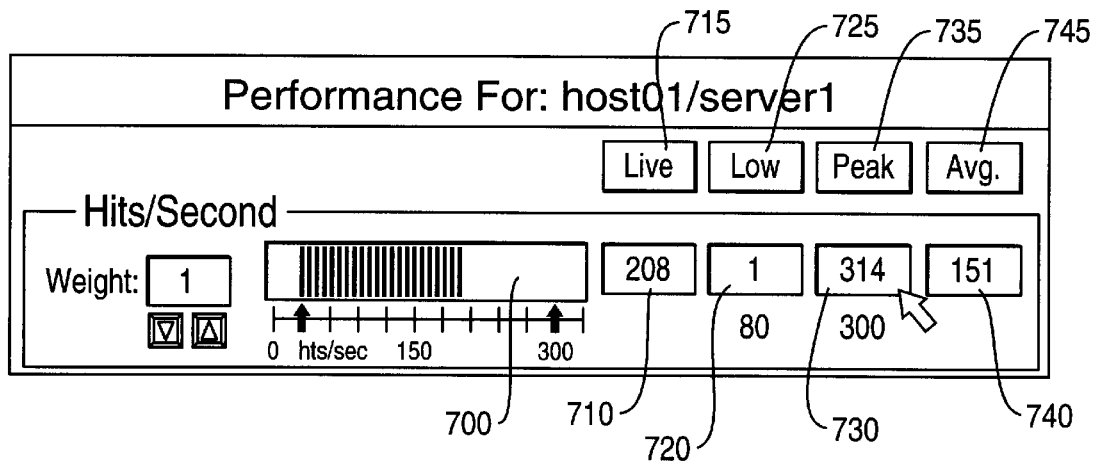
FIG. 7 is an illustration of an LED-type display on a server view.

Refer now to FIG. 7 where a window is illustrated in accordance with the principles of the present invention. The window appears after clicking on the server tab 710 in FIG. 4. The window illustrated in FIG. 7 includes an LED type display 700 having a scale and a bar type indicator which varies depending on the number of hits/second. A box 710 indicates the real-time number of hits and the live number of hits is displayed in LED display 700 by clicking on the live button 715. Similarly, the low number of hits is displayed in box 720. The peak number of hits is displayed in box 730. The average number of hits is displayed in box 740.

Figure 8:
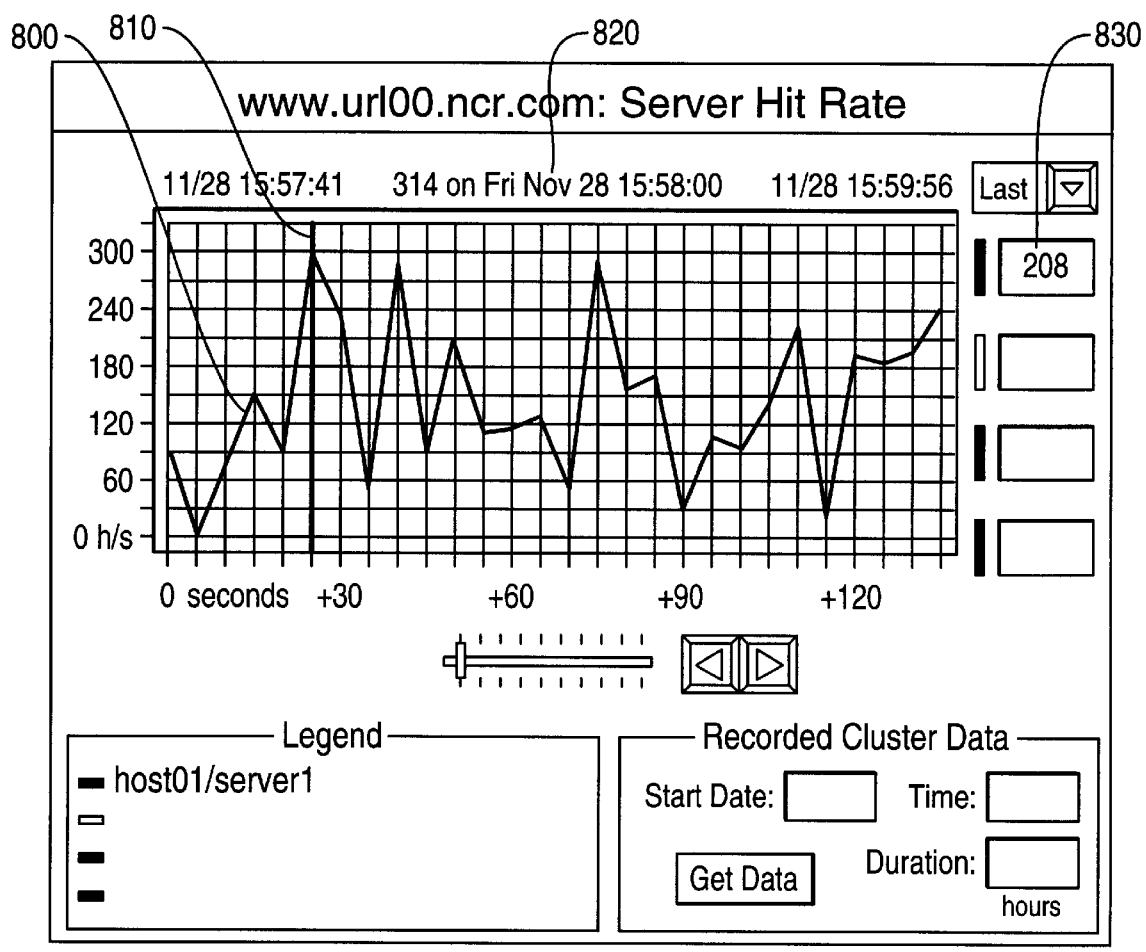
FIG. 8 is a drill-down view including a graph of historical performance.

Referring to FIGS. 7 and 8, when the administrator decides to investigate a peak value that exceeded its upper bound threshold as depicted in box 730, the administrator clicks on the value box 735 which is then highlighted. This action initiates a drill-down action and automatically switches the display from FIG. 7 which is a real-time server tab to the history tab depicted in FIG. 8. By clicking on box 725 the administrator can investigate a value below the low threshold. For purposes of explanation, only the upper bound threshold is explained below.

Upon clicking on box 735, the history view illustrated in FIG. 8 including the appropriate graph is displayed. The graph is displayed in a graph box 800 and the graph is automatically scrolled to the point where the drill-down value depicted in box 730 in FIG. 7 occurred. A white vertical line 810 is drawn through the peak value in the graph depicted in FIG. 8. As a further aid to identifying the drill-down location, a white label 820 is displayed above the graph indicating the drill-down value and the date and time it occurred. A box 830 displays the live value for the number of hits per second. Upon clicking on box 830, a further graph can be drawn using the values from box 830.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented method of changing a display from a display of individual peak values of web site performance to a graphical display of web site performance, including at least one of the individual values, comprising:

displaying the individual peak values representing real-time web site performance;

selecting one of the individual peak values;

presenting a graphical display of historical performance which includes the selected individual peak value; and drawing a vertical line through the selected individual peak value.

2. A computer implemented method of changing a display from a display of individual peak values of web site performance to a graphical display of web site performance, including at least one of the individual values, comprising:

displaying the individual peak values representing real-time web site performance;

selecting one of the individual peak values;

presenting a graphical display of historical performance which includes the selected individual peak value; and drawing a label indicating the value of the individual pack value and the time at which the selected individual peak value occurred.

3. A computer implemented method of changing a display from a display of individual peak values of web site performance to a graphical display of web site performance, including at least one of the individual values, comprising:

displaying the individual peak values representing real-time web site performance;

selecting one of the individual peak values; and presenting a graphical display of historical performance which includes the selected individual peak value; and wherein the display step includes a display area representing an LED display.

4. A computer implemented method of changing a display from a display of individual peak values of web site performance to a graphical display of web site performance, including at least one of the individual values, comprising:

displaying the individual peak values representing real-time web site performance;

selecting one of the individual peak values; and presenting a graphical display of historical performance which includes the selected individual peak value; and wherein the display step is invoked by clicking on a server tab.

5. The method of claim 4, comprising switching from the server tab to a history tab by performing said selecting step.

6. A computer implemented method of changing a display from a display of individual peak values of web site performance to a graphical display of web site performance, including at least one of the individual values, comprising:

displaying the individual peak values representing real-time web site performance;

selecting one of the individual peak values; and presenting a graphical display of historical performance which includes the selected individual peak value; and wherein the method is performed by platform independent executable code.

7. The method of claim 6, wherein the platform independent code is a Java applet.

8. A computer implemented method of changing a display of high level measurements representative of web site performance to low level measurements representative of the web site performance, comprising:

displaying the high level measurements;

selecting one of the high level measurements;

presenting a graphical display of historical performance which includes the selected high level measurement; and drawing a vertical line through the selected individual peak value.

9. A computer implemented method of changing a display of high level measurements representative of web site performance to low level measurements representative of the web site performance, comprising:

displaying the high level measurements;

selecting one of the high level measurements;

presenting a graphical display of historical performance which includes the selected high level measurement; and drawing a label indicating the value of the individual peak value and the time at which the selected individual peak value occurred.

10. A computer implemented method of changing a display of high level measurements representative of web site performance to low level measurements representative of the web site performance, comprising:

displaying the high level measurements;

selecting one of the high level measurements; and presenting a graphical display of historical performance which includes the selected high level measurement; and wherein the display step includes a display area representing an LED display.

11. A computer implemented method of changing a display of high level measurements representative of web site performance to low level measurements representative of the web site performance, comprising:

displaying the high level measurements;

selecting one of the high level measurements; and presenting a graphical display of historical performance which includes the selected high level measurement; and wherein the display step is invoked by clicking on a server tab.

12. The method of claim 11, comprising switching from the server tab to a history tab by performing said selecting step.

13. A computer implemented method of changing a display of high level measurements representative of web site performance to low level measurements representative of the web site performance, comprising:

displaying the high level measurements;

selecting one of the high level measurements; and presenting a graphical display of historical performance which includes the selected high level measurement; and wherein the method is performed by platform independent executable code.

14. The method of claim 13, wherein the platform independent code is a Java applet.

15. The method of claim 1, 2, 8 or 9, wherein the individual peak values are displayed in real-time.

16. The method of claim 1, 2, 8 or 9, wherein the individual peak values include live, low, peak and average values.

* * * * *